Figure 1:
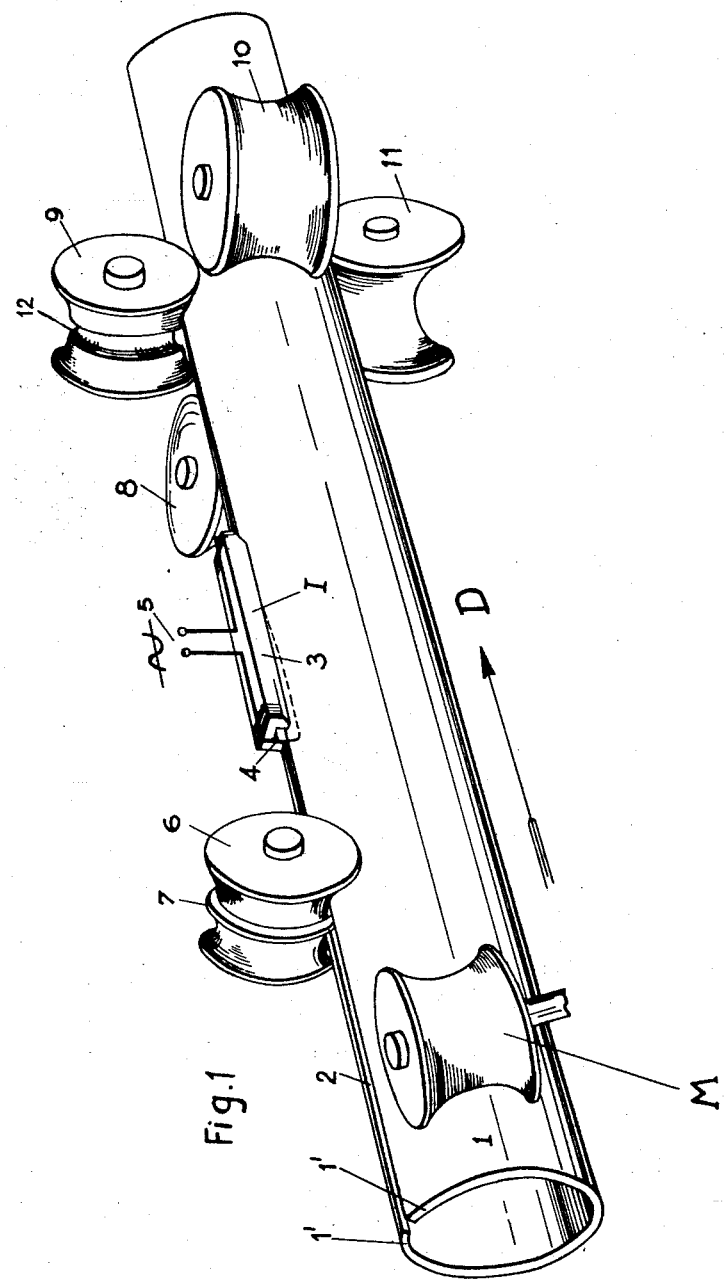
Figure 7:
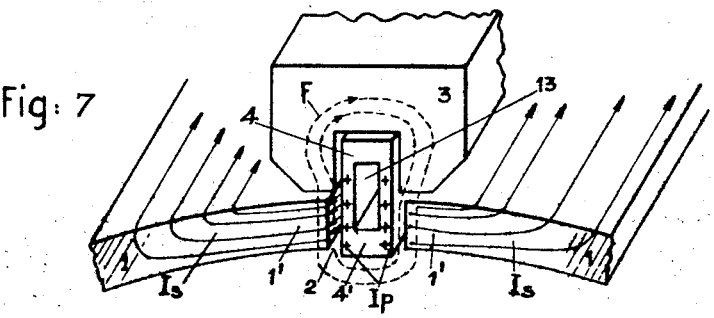

Dec. 13, 1960   R. FRUMKIN   2,964,607
INDUCTION WELDING APPARATUS
Filed July 16. 1956   6 Sheets-Sheet 1

Inventor
R. FRUMKIN
By
Holcombe, Wetherill & Brisbois
Attorneys

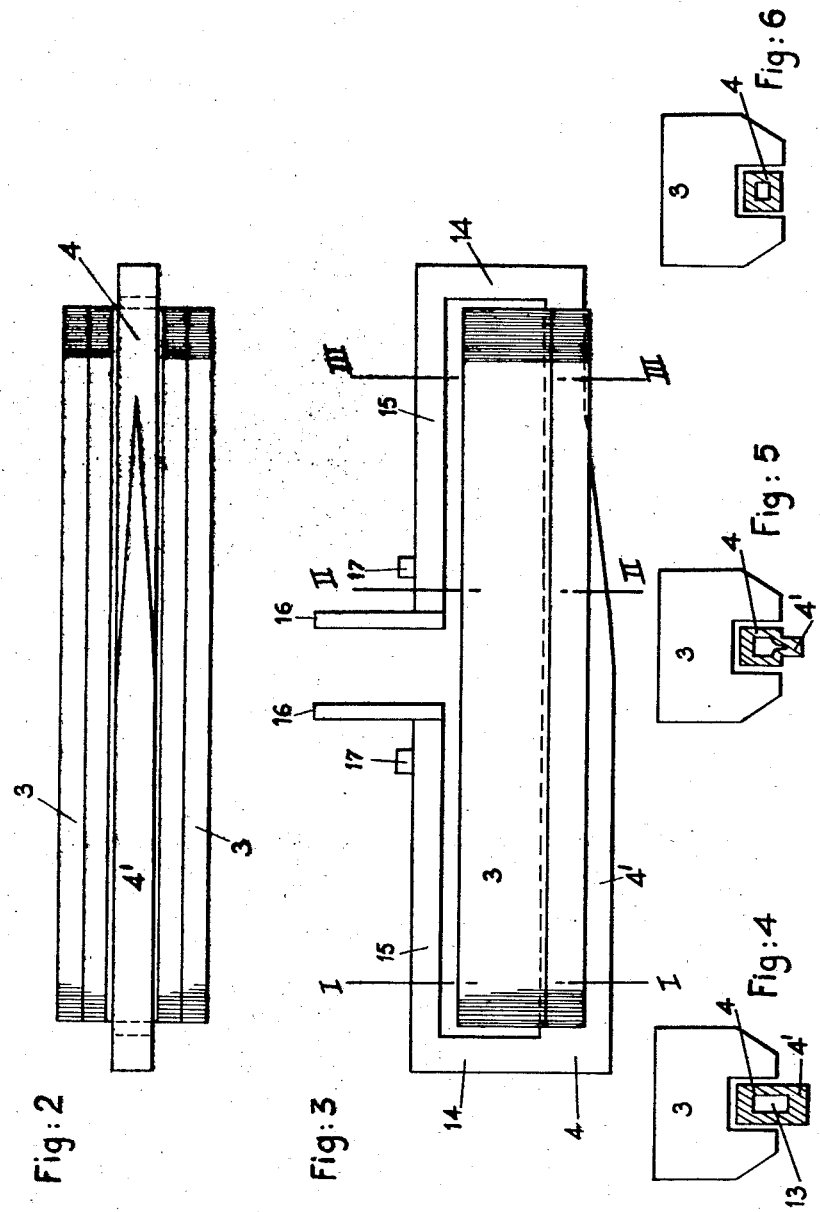

Dec. 13, 1960   R. FRUMKIN   2,964,607
INDUCTION WELDING APPARATUS
Filed July 16, 1956   6 Sheets-Sheet 3

Inventor
R. FRUMKIN
By
Holcombe, Wetherill & Brisebois
Attorneys

Dec. 13, 1960 R. FRUMKIN 2,964,607
INDUCTION WELDING APPARATUS
Filed July 16, 1956 6 Sheets-Sheet 4
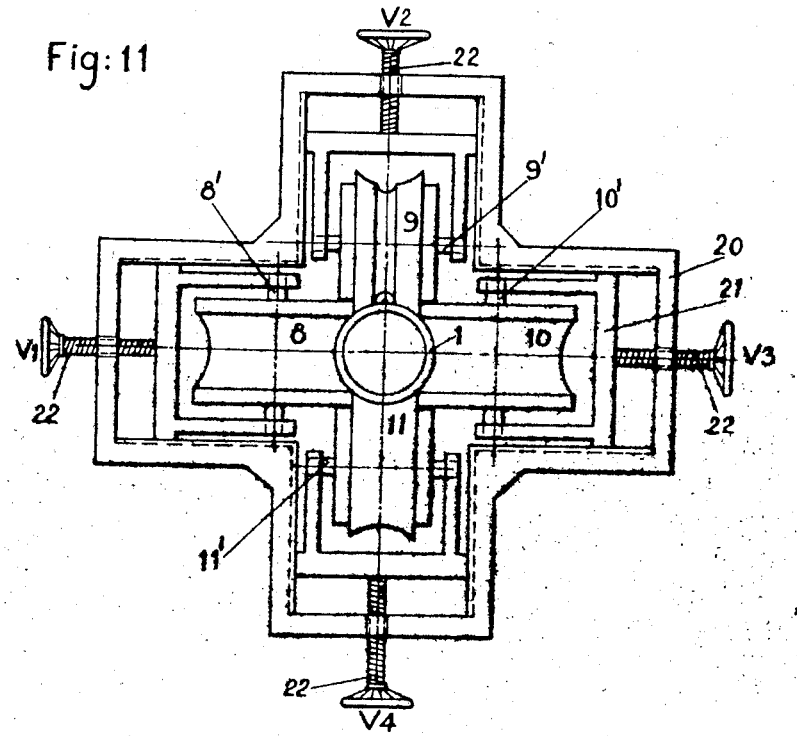
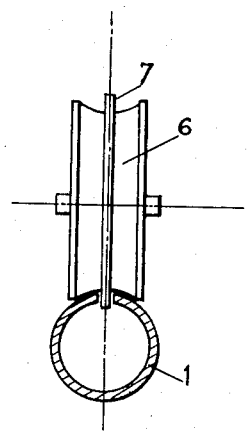
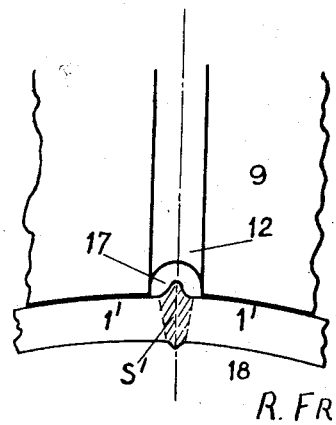
Inventor
R. FRUMKIN
By
Holcombe, Wetherill & Brisebois
Attorneys

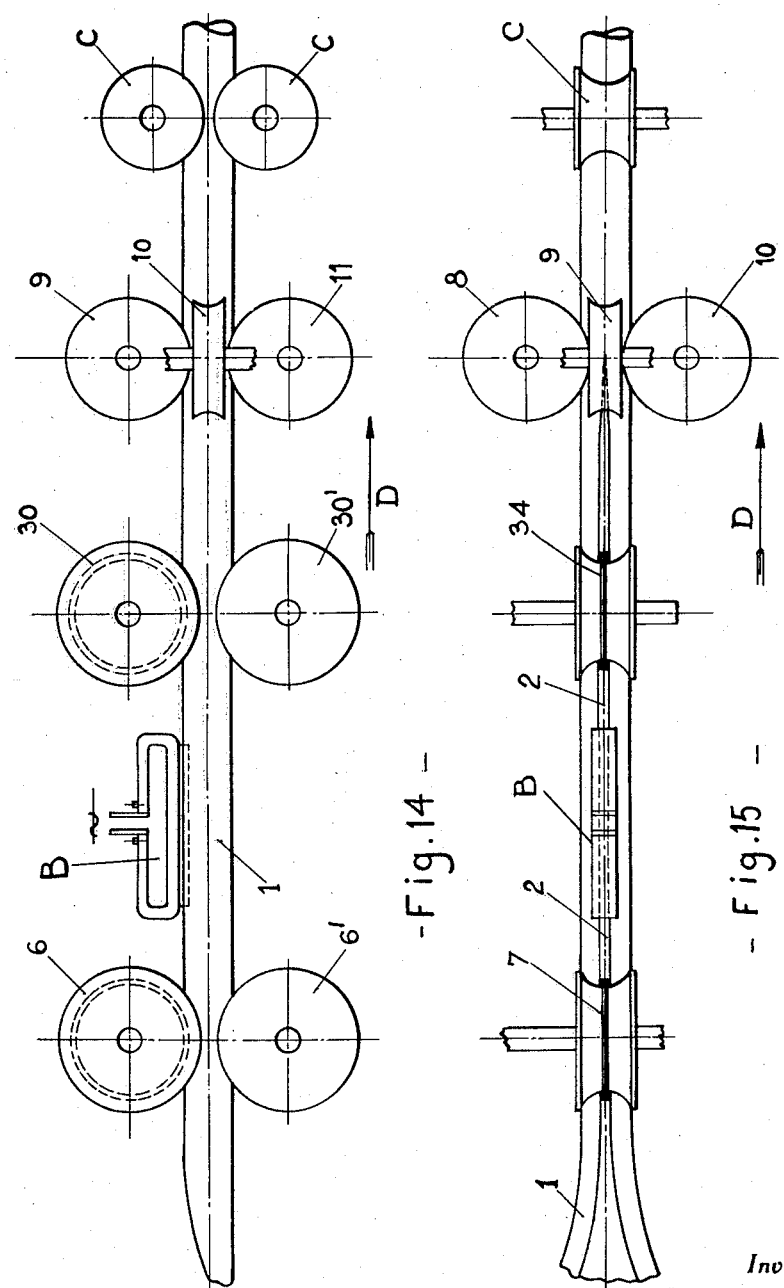

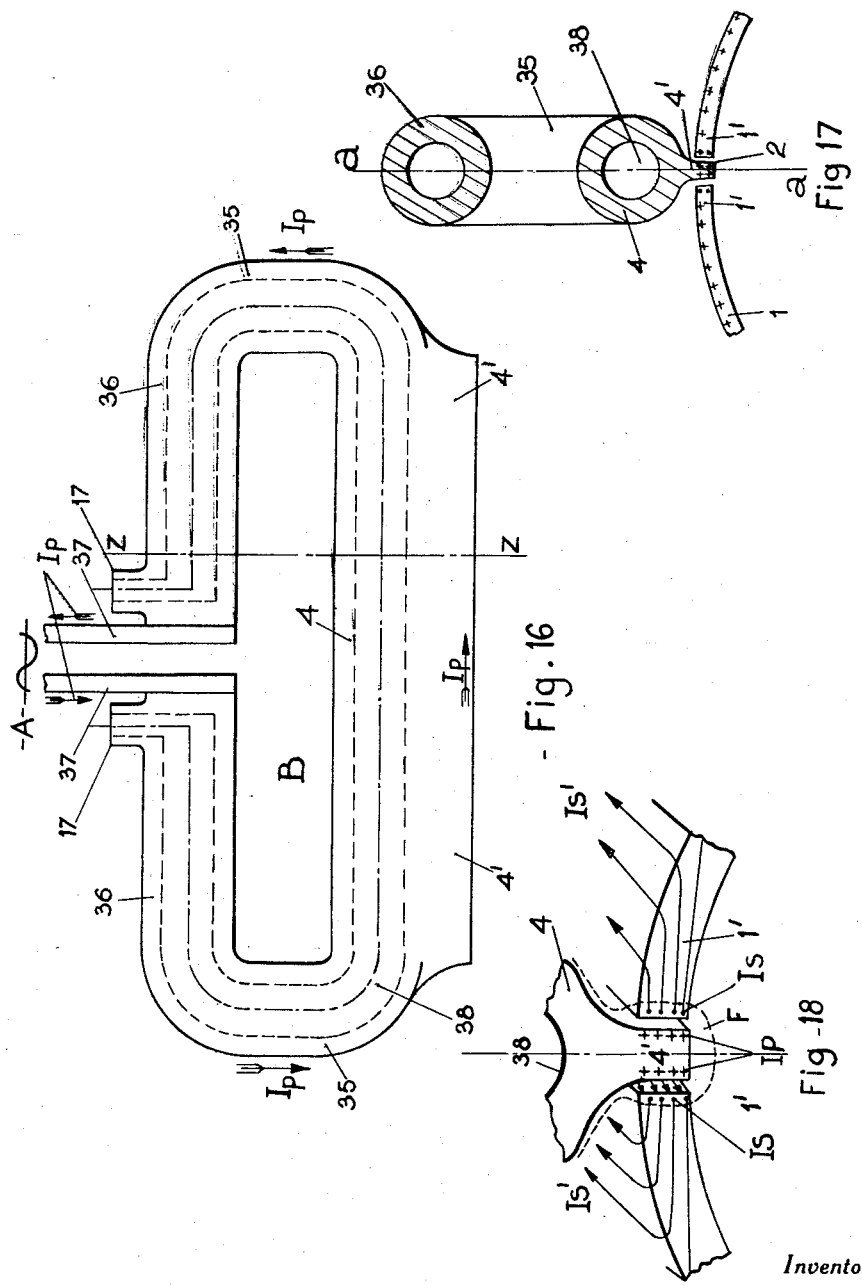

United States Patent Office 2,964,607
Patented Dec. 13, 1960

2,964,607

INDUCTION WELDING APPARATUS

Raphael Frumkin, Paris, France, assignor to Societe Metallurgique Technique et Commerciale, Casablanca, Morocco, North Africa, a body corporate of Morocco, North Africa Filed July 16, 1956, Ser. No. 598,492

Claims priority, application France Aug. 8, 1955

6 Claims. (Cl. 219—8.5)

The present invention relates to the butt welding of metallic parts, using the heating thereof by induction, and particularly to the welding of parts having a considerable thickness. More particularly the invention is concerned with the welding of the longitudinal lips of a tubular blank, for the purpose of continuous manufacture of tubes of all kinds and particularly steel tubes.

Generally, tubes are manufactured from a metal strip which is folded so as to form a tubular blank of which the oppositely disposed longitudinal lips are first heated to the appropriate temperature and are then pressed against one another so as to weld them.

The heating may be effected by the method known as the resistance method, consisting in causing a current of very high intensity to pass through the plane of the desired joint, said current being introduced into the lips of the blank by means of a rotating electrode pressed in contact with the tubular wall. Although this method has proved effective for the manufacture of tubes of relatively small thickness, it does not give satisfactory results with thick walls. In fact, the heating current is introduced into the lips for a very short time and does not extend throughout the entire section of the lips. Their inner portion does not attain the welding temperature on approach of the lips towards each other and the joint at this point is not properly completed. If it is attempted to remedy this by greatly increasing the intensity of the heating current, difficulties are encountered in the passage of the current between the electrode and the walls of the blank and necessitates expensive electrical installations. If, for the purpose of giving the current time to penetrate more deeply into the mass of the metal, the duration of its penetration is increased, it is necessary considerably to slow down the speed of passage of the blank and consequently the manufacturing output is reduced. Moreover, the method of heating by resistance requires scouring of the surface of the metal strip and shearing of its edges in order to obtain a good and constant state of contact between the lips and a good contact between the electrode and the blank, and these conditions cannot be obtained in practice after a certain thickness and a certain diameter of the strip so that the resistance method is limited to tubes of which the thickness does not exceed 5 millimetres.

For the purpose of welding thick tubes, recourse has hitherto been made either to the use of heating by an electric arc formed between a supply electrode and the metal of the blank, or a very strong current, which is made to pass between the lips which are spaced a small distance apart, and which produces a violent arc. Although these methods have proved effective and have enabled tubes to be manufactured the thickness which may attain 10 millimetres and more and of which the diameters measure some tens of inches, the speed of manufacture remains relatively very slow and their application requires a relatively complicated labour force and installation, so that the costs of manufacture distributed over the tonnage obtained are relatively high.

It is also know to weld tubes by heating their edges by the induction effect, by means of induced currents extending parallel to the line of the joint line. To this end, use is made of an inducing means or inductor disposed close to the tube and entirely outside its lips, the tendency being to keep the latter closed in order to increase the heat yield. Under these conditions, the heating zone contracts towards the inside of the wall of the lips, and in order to be able to bring them to the welding temperature over their entire section it is necessary substantially to reduce the frequency of the inducing current and to increase the width of the heating zone outside the blank, this presenting certain technical difficulties and reducing the output.

The subject of the present invention is a method of welding using heating by induction, which enables continuous production to be obtained at elevated industrial speeds with a good output and without complicating the installation or the labour required.

The invention also provides a machine enabling a tubular blank to be advanced, its lips to be uniformly heated over their entire section, and said lips to be forcibly compressed for the purpose of obtaining a solid joint.

Moreover, the invention also provides an inductor of special form which enables the desired heating to be effected, and a special system of compression for the heated edges, facilitating the use of the said inductor.

In accordance with the invention, a wide open tubular blank, that is to say a tubular blank of which the edges are spaced widely apart, is heated by induction, and the effect of induction is exerted uniformly over the entire section of the lips; the latter are then compressed so as to maintain their spacing over a large part or all of the heating zone.

A machine for carrying out this method comprises essentially means for advancing the blank, means for keeping the gap between the lips open, an inductor extending in the direction of advance and penetrating radially into the said gap so as to be situated opposite the opposite edges of the lips, and a system for clamping the hot lips, which is designed so as to shorten as far as possible the zone where the lips are brought close together under the clamping action.

An inductor according to the invention comprises essentially a bar capable of conducting an alternating current of high frequency and of high intensity, surrounded by a magnetic core for concentration of flux, said bar having a part housed inside a notch in the said core and a part forming a projection or appendage, which is intended to penetrate in the gap between the lips of the blank.

The said appendage has a height and a width which gradually recede towards the end of the inductor facing the clamping system.

The system for clamping the hot lips may comprise horizontal rollers which are adapted to compress the side walls of the blank, and vertical rollers disposed at the top and at the bottom of the blank and enabling the pressure to be conveniently distributed over the lips and to impress them correctly one into the other, while reducing to a minimum the zone in which they are close together in advance of the forging plane.

The rollers may each cover approximately 90° of the periphery of the blank, and the top vertical roller preferably has a circular groove intended to house the ridge forming during forging.

Alternatively, instead of using the roller system, sometimes called a "Turk's head," for protecting the inductor against accidental contact with the lips, the inductor may be given a different shape and it may be disposed in a special manner in relation to the blank, in combination with special guide means, which renders it possible exactly to fix the position of the inductor in relation to the lips to be welded, as is also the case in the arrangement utilising the Turk's head. Moreover, the section of the heated metal in each lip is reduced to the minimum and a high efficiency is obtained, thus enabling speeds to be obtained for a given electric supply power, for the continuous welding of tubular blanks, which are very considerably greater than any of those speeds obtained by any known methods of lateral electrical heating effected both by induction and by the direct passage of current, characterising the so-called resistance method. Furthermore, the heating depth is distributed uniformly over the entire section of the lips, thus rendering possible, in conjunction with the preceding characteristic, the obtaining of mechanically solid weld while reducing to a minimum the size of the ridges formed by the hot metal driven out by the forging. Finally an inductor without a concentrating magnetic core may be used, thus appreciably reducing the weight of the installation and in particular saving relatively large losses in the core subjected to the high frequency field.

The advantages cited render this alternative form of the invention particularly useful for the welding of tubes having relatively thin walls and, in addition, for the welding of tubes of small diameter, for which it is important to reduce the size of the inner ridge and to allow the return currents closing the circuit of the heating currents induced in the lips to spread out in the largest possible section of the tube.

Use may therefore be made of guide rollers disposed ahead of and after the inductor dipping into the gap, said rollers acting as distance-pieces maintaining the spacing of the lips and thus fixing a certain zone having a constant gap in which the projecting part of the inductor is housed.

According to another modification, heating is effected by means of a single dipping inductor only, which is disposed in the gap maintained by the spacing rollers and which is followed directly by a clamping system effecting the weld.

Said inductor is, in particular, produced in the form of a narrow solid bar, which penetrates radially into the gap over the entire depth of the lips, said bar being connected to a larger section of the inductor in which a cooling medium circulation passage is provided, this part of the inductor being disposed entirely outside the blank.

Said inductor is made of a material which is as good a current conductor as possible, and particularly of copper or copper alloy, and said inductor is used without the addition of a magnetic core.

In order that the invention may be more clearly understood, reference will now be made to the accompanying drawings which contain certain specific embodiments thereof by way of example, and in which:

Figure 1 shows a perspective view of the essential elements of a machine for welding tubes according to the invention, Figures 2 and 3 show respectively in a view from below and in elevation the inductor used in the arrangement of Fig. 1, Figures 4, 5 and 6 show cross sections of the bar and of the core of said inductor along the lines I—I, II—II and III—III respectively of Fig. 3, Figures 7 to 10 show the part of the inductor and of its appendage in relation to the lips of the tubular blank in different planes of its passage beneath the inductor, said figures at the same time showing the direction of the magnetic coupling flux between the inductor and the lips and also the paths of the inducing and induced currents which determine the heating effect, Figure 11 shows an elevation of an arrangement for compressing the walls of the tubular blank for the purpose of forging the lips, Figure 12 shows on a large scale the top roller with its groove intended to receive the forging ridge, Figure 13 shows a front view of the roller for guiding and spacing the lips situated in advance of the inductor shown in Figure 1, Figures 14 and 15 are respectively an elevation and a plan view of a modification of the invention using a single dipping inductor followed directly by devices for closing the gap and for forging, Figure 16 is an elevation on an enlarged scale of the inductor shown in Figure 14, Figure 17 is a section on the plane Z—Z in Figure 16, and Figure 18 is a still further enlarged view of the part shown in Figure 17 comprising the ends of the lips and the dipping bar of the inductor.

In all the figures, like members have been giving like references.

In Figure 1, the tubular blank 1 is given a continuous movement of advance in the direction of the arrow D, under the action of an appropriate driving mechanism of which only a driving roller M is shown for the sake of simplicity. Said blank originates from a flat steel strip which is progressively folded by a set of rollers (not shown) forming part of a usual forming machine. Said blank may also originate from a circularly deep-drawn plate, which then has the form of a ferrule.

A vertical roller 6 embracing the upper part of the blank, contains a circular crown 7 acting as a knife penetrating between the lips 1'—1' of the blank and holding them wide open so as to cause a gap 2 between them. Said knife serves at the same time to maintain the gap in alignment with the inductor I disposed behind and extending parallel to the gap and facing it. Said inductor, which is shown in greater detail in Figures 2–6, comprises a magnetic core 3 formed of plates of magnetic sheets and having the shape of an inverted U with two polar horns forming a notch in which is housed a bar 4 extending in the direction of translation of the blank. Said bar is fed by a source 5 of current of medium frequency, i.e. between 500 and 15,000 cycles per second, which has an intensity of several thousand amperes. The source 5 is connected to the ends of the bar by vertical uprights 16, the horizontal conductors 15—15, and the vertical uprights 14, the whole forming a loop disposed symmetrically in relation to the lips in the radial plane passing through the centre of the gap. The conductors 4, 14 and 15 have an inner channel through which circulates a cooling liquid which is supplied and discharged through the orifices 17. The part of this channel affecting the bar 4 is designated by 13.

The bar 4 has an appendage 4' projecting on the core 3 and intended to penetrate radially into the gap 2 between the lips 1' of the blank (Figures 7 to 10). Over a certain length of the inductor, said appendage has the same width as the base bar, as is shown in Figure 4. Then, on progressively approaching the end of the inductor facing the forcing plane said appendage gradually recedes, disappearing completely before the end of the inductor. At the same time, the height of the appendage undergoes a gradual variation in the same direction. At the inlet of the inductor, on the side of the guide roller 6, and over a certain length, which may reach half the length of the inductor, the appendage maintains a height which corresponds to the entire thickness of the lips. This height then progressively decreases, so that in the plane III—III (Figures 3 and 6) the body of the bar is reduced to its base element 4 which is situated entirely outside the gap and is situated on both sides facing the lips.

Rearward of the inductor is situated the forging system comprising two horizontal rollers 8 and 10 embracing the side parts of the blank and two vertical rollers 9 and 11, the roller 9 riding and compressing the upper part of the blank containing the lips, the roller 11 supporting the base of the blank. On leaving this set of rollers the tube is welded and is brought, by a conventional driving system (not shown), to the sizing, straightening, and possibly also sectioning stages, in the event of use being made originally of a continuous strip.

The crown 7 of the guide roller 6 is disposed exactly in the plane of symmetry of the inductor passing through the centre of the bar 4. The width of said crown is fixed so as to maintain a gap between the lips enabling the appendage 4' of the bar to penetrate therein without friction.

The forging rollers 8, 9, 10 and 11 are mounted so as to be capable of individual adjustment in relation to the blank. They are supported by a mount or frame 20 through which pass the threaded rods 22 controlled by hand wheels $V_1$, $V_2$, $V_3$ and $V_4$. Said rods bear against movable sleeves 21 supporting the spindles 8', 9', 10' and 11' of the corresponding rollers. It is thus possible to regulate, as desired, the pressure exerted by each of the rollers, which each cover approximately a quarter of the periphery of the tube. The top vertical roller 9 has a circular groove 12 into which the metal S' of the lips is driven during the compressing operation, said metal forming an outer ridge 17 of the seam of the welded tube.

In certain cases, the said groove 12 may be given a width which is much greater than that of the ridge and which corresponds to the entire section of the lips which has attained the welding temperature, so as to avoid their contact with the roller. Generally, this precaution is unnecessary, the rollers being strongly cooled by a stream of water and not having any tendency to stick to the hot metal.

When use is made of a strip of metal of which the width corresponds exactly to the perimeter of the tube formed from said strip, the groove 12 may be eliminated and a small excess of metal forming during forging may be driven into the lips of the tube. Said lips then give a smooth external surface in a welded tube, this affording the advantage of enabling the ridge cutting operation after the welding stage to be eliminated.

During the operation, and as will be seen more particularly from Figures 7 to 10, the blank 1 has its lips 1' wide open in front of the inlet of the inductor (Figure 7) and the appendage 4' penetrates into the gap 2 over its entire height. The inducing current or primary current $I_p$ which circulates longitudinally in the bar 4—4' and which is assumed to enter the plane of the paper, produces a magnetic flux F which is confined, owing to the concentrating action of the cores, to the ends of the lips 1'—1'. Under the effect of this flux and also owing to the presence of the bar facing and in the immediate vicinity of the ends of the lips, the latter become the seat of the induced or secondary current $I_s$, which circulate longitudinally, in the superficial zone of the lips and extend in the same direction from the rear to the front. The currents in each of the lips are then closed in the side parts of the blank 1, forming independent secondary loops.

The concentration of the lines of currents in the ends of the lips determines their rapid heating by the Joule effect, to which is added, in the case of magnetic materials, heating by hysteresis due to the direct action of alternating magnetic flux.

Since the paths of the return currents are distributed, extending throughout the entire lateral section of the blank, their thermal effect is relatively low and this part of the blank remains relatively cold.

Figure 8:
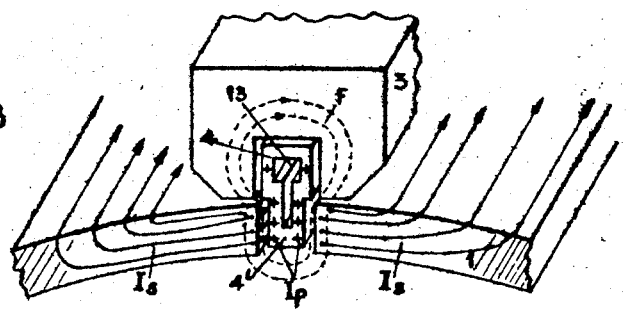
Figure 9:
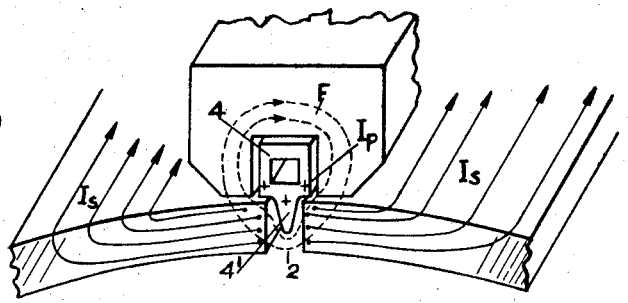
Figure 10:
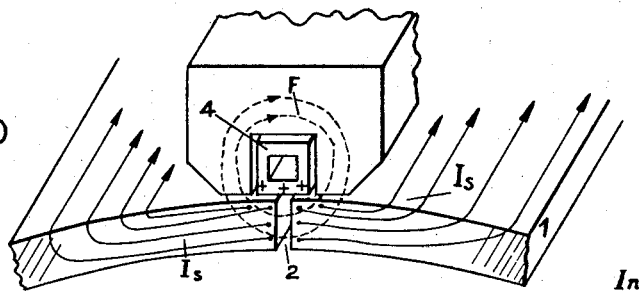

Figure 8 shows the induction picture approximately halfway beneath the inductor. It may be assumed that at this moment the lips have reached a temperature of 800° C., corresponding to the Curie point of iron, and have lost their permeability. From this moment onwards, the gap between the lips begins to reduce rapidly in consequence of the pressure exerted by the forging device. The appendage 4' (Figure 9) penetrates only to half the width; however, since the metal has lost its permeability, the flux continues to penetrate deeply into the metal mass and to induce currents in its entire section. Finally, in the portion in Figure 10 corresponding to the almost closed gap at the end of the inductor on the forging side, we find the conditions characterising normal heating by induction, with the bar 4 completely out of the gap and facing the side cheeks of the lips.

At the outlet of the inductor, the strictly delimited front walls of the lips have attained the welding temperature of the order of 1400° and are greatly compressed in the forging device and are solidly welded together with the formation of an outer ridge 17 and a much smaller inner ridge. The material driven into these ridges originates from the zone S (Figure 12) and generally contains all the oxides and impurities of the starting metal.

The system of forging by means of four rollers embracing the entire tube offers a very appreciable advantage in the method of heating described.

By suitably adjusting the pressure and, more particularly by making the upper vertical roller 9 act on the hot lips, the zone in which the lips are close together is distinctly reduced and the same gap is maintained practically between the guide roller and approximately half of the inductor, thus enabling the appendage 4' to be maintained in front of the entire section of the lips during half of the travel beneath the inductor, without any danger of contact, and thus enabling the duration of localised internal heating in the edges of the lips to be considerably increased.

Another advantage of this system of rollers is to be found in the fact that it enables the lips to be welded and at the same time imparts a permanent curvature to them so that they no longer have the tendency to open on leaving the forging plane and jeopardise the solidity of the joint.

The lower vertical roller serves as a counterweight to the pressure exerted by the upper roller and prevents the tube from folding.

By suitable adjustment of the pressure of the top roller, and by producing a slight flattening of the region of the lips, the line of the joint will be maintained exactly in the plane of symmetry of the inductor, and thus the edges of the lips will be prevented from touching the heating appendage accidentally. Moreover, this maintaining of alignment enables the two lips of the blank to be heated at an equal rate and thus ensures the optimum quality of the weld.

The system described permits the continuous welding of tubes of which the walls have a thickness ranging from 5 millimetres to 12 millimetres, with feed speeds of the order to 20 metres per minute, using frequencies of the order of 2,000 to 4,000 cycles per second, and this is possible using an inductor the length of which is of the order of 50 centimetres. For very thick tubes, of 10 to 12 millimetres wall, the width of the appendage may be selected in particular to be from 10 to 14 millimetres, so as readily to provide therein a cooling channel, and the gap between the lips may then be kept at respectively 12 and 16 millimetres, so as to bring the faces of the lips to 1 millimetre from the heating bar. The polar horns of the core, together with the base bar 4 housed in the slot, may be placed 1 to 2 millimetres from the surface of the blank.

In certain cases, instead of reducing the height and the width of the appendage at one and the same time as described above, it is possible simply progressively to reduce the width only and to maintain the height, in which case the appendage will take the form of a blade at the outlet of the inductor.

In a simplified form of machine in accordance with the invention, shown in Figures 14 and 15, use is made of a single dipping inductor placed between the gap-guide rollers 6 and 30, of which the circular projections 7 and 34 respectively determine and maintain a gap 2 with which the inductor B cooperates. After the rollers 30 and in the direction of continuous passage D of the tubular blank, is situated the so-called Turk's head forging stage, formed by two horizontal rollers 8 and 10 and two vertical rollers 9 and 11, embracing the entire periphery of the tube. These rollers may be fixed and regulated as is shown in Figure 11. The welded tube then passes through the driving rollers C of the gauging stage before passing through the cooling, straightening and sectioning stages.

It is assumed that the top roller 9 of the forging stage has a smooth and continuous groove bearing against the lips and preventing the formation of any upper ridge. Under these conditions it is superfluous to provide a ridge planing tool, which is usually disposed immediately after the forging plane.

As shown in Figures 16, 17 and 18, the inductor B is of a skeleton type and has no magnetic core. It comprises a relatively narrow and solid bar appendage 4' penetrating radially into the gap 2 over its entire depth and thus completely covering the faces of the lips to be welded. Said bar forms the extension of a bar 4 of circular section disposed entirely outside the blank. Their supply circuit comprises the vertical conductors 35—35 connected to the bar 4, leading to the horizontal conductors 36—36 which are connected to the uprights 37—37 leading to an alternating current supply source A. A passage 38 is provided in the mass of the inductor for the circulation of a cooling liquid which is supplied and discharged through the appendage 17—17. The inductor is disposed in relation to the tubular blank 1 so that the vertical plane of symmetry of the inductor $a$—$a$ coincides with the vertical median plan passing through the centre of the gap 2 between the lips 1'—1' as shown more clearly in Figure 17.

During the operation, the tubular blank after passing through the forming stages (not shown), passes through the rollers 6'—6' which complete the forming, while providing a gap 2 into which the heating appendage 4' of the inductor penetrates.

The primary current $Ip$ circulating in the bar and assumed to extend toward the rearward part of the machine, induces in the edges of the lips secondary currents $Is$ in the opposite direction, hence extending toward the forward part, as shown in Figure 18. The primary and induced currents of opposite directions tend mutually to attract one another and to be localised in the facing edges. The consequence of this is that the primary current $Ip$ is distributed practically exclusively in the appendage 4' and that the secondary currents $Is$ concentrate in a very narrow section of the lips, exactly opposite said appendage. Since the bar 4 is situated relatively far away from the metallic mass of the blank, it practically takes no part in the induction. The magnetic flux F coupling the appendage with the lips surrounds the lines of the primary current which gives rise to this flux. The latter is closed by passing round the profile of the bar 4, which, like the rest of the inductor, is made of non-magnetic material, such as copper or bronze, which is at the same time an excellent electrical conductor.

The concentration of the secondary currents in the edges of the lips and their uniform distribution over their entire section manifest themselves in rapid and equal heating of the ends of the lips, with the minimum expenditure of energy. This localisation of the heating effect is obtained without the need of a concentrating magnetic core thus rendering possible the elimination of this member, which is relatively heavy and which absorbs a considerable number of kilowatts. The currents induced in the lips are closed along the paths $Is'$ distributed over the entire lateral face S—S of the blank. The currents induced in each of the lips thus form independent secondary loops which at no point cross the gap, so that the latter does not come into the formation of the secondary electrical circuits and only the space separating the appendage 4' from the lips and the electrical conditions of supplying the inductor determine the heating process.

At the outlet of the inductor, the lips have attained their welding temperature and are compressed in the forging device 8–11 which is regulated by taking into account the fact that the heating of the lips is localised in their ends over a small depth.

In selecting the frequency of the induction currents and suitably fixing the heating period which is dependent on the speed of passage and the length of the inductor, it is possible to reduce to a minimum the mass of metal driven out from the lips during their clamping, and thus to reduce to the strict minimum the size of the ridges. In particular, by using a sheared steel strip having parallel edges and a frequency of the order of 8–10,000 cycles per second determining a heating depth of the order of 1 millimetre, it is possible for welding to be effected with an insignificant inner ridge while avoiding the outer ridge by the use of a top roller in the Turk's head with a smooth groove.

The distribution of the induced currents, as illustrated in Figure 18, is particularly advantageous in welding tubes of small diameter, such as below 1 inch. By limiting to a minimum the part of the lips through which pass the concentrated heating currents, the section available to the currents extending in the lateral part of the blank is increased to a maximum. The loops of the induced currents are thus closed through minimum impedances, thus substantially improving efficiency. Moreover, the use of a narrow heating appendage enables work to be carried out with blanks of small diameter, which can be stacked circularly while providing a gap receiving said appendage.

Thus, for example, for tubes of a wall thickness of 3 millimetres a gap of 3 mm. can be fixed and use be made of an inductor appendage of a width of 1.5 to 2 millimetres penetrating into the gap over its entire depth. Since this appendage is of copper, which is a good conductor of heat, it will be adequately cooled by the circulation of water in the cooling passage situated relatively nearby. To allow for the fact that the circular blade 34 of the roller 30 is applied against the lips of metal having attained the welding temperature, said roller will be strongly cooled by a stream of water and the blade could be made in particular of refractory metal, such as tungsten. The use of a Turk's head as a forging arrangement renders it possible considerably to shorten the zone in which the lips are close together and to prevent any incident during the passage of the blank beneath the guide roller 30. Moreover, this forging system, by exerting a uniform pressure on both lips, renders it possible to avoid any risk of rotation of the tube and hence any troublesome reaction over the last guide stage 30—30'.

The use of an inductor dipping into a maintained gap facilitates the positioning control of the inductor, which must always be situated symmetrically in relation to the lips. Furthermore, under these conditions, it is ensured that the heating is distributed equally over the two lips, this being an indispensable condition to be fulfilled to obtain a good weld.

In certain cases, the function of the device 8–11 could be limited to complete closure of the tube and a second Turk's head be placed after it which exerts a more forcible clamping action leading to the weld.

The tight electromagnetic coupling between the inductor and the lips and the concentration of their heating over a small depth ensure very high efficiency of the operation rendering it possible, for a given supply power, to attain maximum welding speeds.

Thus for example with a power supply of the order of 100 kilowatts high-frequency for the inductor, it would be possible to weld a steel tube of 3 mm. thickness at a speed of the order of 50 metres per minute.

The examples described hereinabove have related to the continuous welding of tubular blanks passing continuously beneath an immovable inductor, the lips being brought progressively to their welding temperature.

The invention is, however, also applicable to the intermittent welding of the lips of an immovable blank, or of two separate immovable parts, for example of the ends of the flat strips belonging to two rolls of strip intended to feed the welding machine. In that case the dipping inductor will be provided with a device rendering it possible to maintain it between the lips in the heating position and to cause it to leave the gap as soon as the heating period is concluded. The edges of the lips will then be intensely compressed by a movement bringing the lips close together. Other modifications are also possible. For example instead of a fixed inductor heating a movable blank, it is feasible to imagine, without thereby departing from the scope of the invention, a fixed blank and a movable inductor with its guiding and forging device.

I claim:

1. Induction heating apparatus for butt-welding a seam between two opposed edges of a tubular member to be welded together, of the kind in which means are provided for continuously feeding said member in a fixed path of movement within the range of an inductor operative to cause induced currents to flow in said tubular member in the direction of feed to heat said opposed edges, said apparatus comprising guide means for locating the said opposed edges in alignment with the inductor as the tubular member is driven therepast, said guide means including a fixedly supported spacer member located between and engaging said opposed edges to hold them apart with a gap therebetween of predetermined width, an elongated inductor arranged symmetrically with respect to said path of movement and located beyond said spacer member in the direction of feed of the tubular member and including a conductor having a longitudinally extending part which is narrower than said predetermined width and which projects into the gap between said opposed edges to be heated, means fixedly supporting said inductor with said longitudinal projecting part aligned centrally of said spacer member in the direction of feed, and compressing means located beyond said inductor in the direction of feed for compressing said heated edges together to weld the seam while maintaining them aligned symmetrically with respect to the plane of symmetry of the inductor, said compressing means comprising laterally adjustable compressing members exerting opposed lateral pressures inwardly on the sides of the tubular member and a vertically adjustable compressing member exerting an inward pressure on the marginal zones of the tubular member adjacent the edges to be joined whereby the seam is maintained in central alignment with the plane of symmetry of the inductor, the widths of said spacer member and said longitudinal projecting part of the inductor and the distance between the spacer member and the compressing means being so dimensioned that said opposed edges are spaced from and do not touch said longitudinal projecting part during their passage between the spacer member and the compressing means.

2. Induction heating apparatus for butt-welding a seam between two opposed edges of a tubular member to be welded together, of the kind in which means are provided for continuously feeding said member in a fixed path of movement within the range of an inductor operative to cause induced currents to flow in said tubular member in the direction of feed to heat said opposed edges, said apparatus comprising guide means for locating the said opposed edges in alignment with the inductor as the tubular member is driven therepast, said guide means including a roller journaled apart from the inductor in fixed position with respect to said path of movement and having a peripheral spacer rib which projects between and engages said opposed edges to hold them apart with a gap therebetween of a predetermined width, an elongated inductor arranged symmetrically with respect to said path of movement and located beyond said roller in the direction of feed of the tubular member and including a conductor having a longitudinally extending part which is narrower than said predetermined width and which projects into the gap between said opposed edges to be heated, means fixedly supporting said inductor with said longitudinal projecting part aligned centrally of said spacer rib in the direction of feed, and compressing means located beyond said inductor in the direction of feed for compressing said heated edges together to weld the seam while maintaining them aligned symmetrically with respect to the plane of symmetry of the inductor, said compressing means comprising a pair of laterally adjustable pressure rollers mounted to engage and exert inward pressure on opposite sides of the tubular member and a vertically adjustable pressure roller which is mounted to engage and exert inward pressure on the marginal zones of the tubular member adjacent the edges to be joined whereby the seam is maintained in alignment with the plane of symmetry of the inductor, the widths of said peripheral spacer rib and said longitudinal projecting part of the inductor and the distance between the spacer rib and the compressing means being so dimensioned that the said opposed edges are spaced from and do not touch said longitudinal projecting part during their passage therepast.

3. Induction heating apparatus for butt-welding a seam between two opposed edges of a tubular member to be welded together, of the kind in which means are provided for continuously feeding said member in a fixed path of movement within the range of an inductor operative to cause induced currents to flow in said tubular member in the direction of feed to heat said opposed edges, said apparatus comprising guide means for locating the said opposed edges in alignment with the inductor as the tubular member is driven therepast, said guide means including a fixedly supported spacer member located between and engaging said opposed edges to hold them apart with a gap therebetween of a predetermined width, an elongated inductor arranged symmetrically with respect to said path of movement and located beyond said spacer member in the direction of feed of the tubular member and including a conductor having a longitudinally extending part which is narrower than said predetermined width and which projects into the gap between said opposed edges to be heated, means fixedly supporting said inductor with said longitudinal projecting part aligned centrally of said spacer member in the direction of feed, and compressing means located beyond said inductor in the direction of feed for compressing said heated edges together to weld the seam while maintaining them aligned symmetrically with respect to the plane of symmetry of the inductor, said compressing means comprising a pair of laterally adjustable pressure rollers mounted to engage and exert inward pressure on opposite sides of the tubular member and a pair of vertically adjustable pressure rollers one of which is mounted to engage and exert inward pressure on the marginal zones of the tubular member adjacent the edges to be joined and the other of which is mounted to engage and support the tubular member opposite the seam, and means for independently adjusting the position of each of said pressure rollers in directions substantially radially of the tubular member, the widths of said spacer member and said longitudinal projecting part of the inductor and the distance between the spacer member and the compressing means being so dimensioned, and the lateral and vertical positions of the pressure rollers being so adjusted, that the said opposed edges are spaced from and do not touch said longitudinal projecting part during their passage therepast.

4. Induction heating apparatus for butt-welding a seam between two opposed edges of a tubular member to be welded together, of the kind in which means are provided for continuously feeding said member in a fixed path of movement within the range of an inductor operative to cause induced currents to flow in said tubular member in the direction of feed to heat said opposed edges, said apparatus comprising fixedly supported guide means for locating the said opposed edges in alignment with the inductor as the tubular member is driven therepast, said guide means including a roller having a peripheral spacer rib which projects between and engages said opposed edges to hold them apart with a gap therebetween of a predetermined width, an elongated inductor arranged symmetrically with respect to said path of movement and located beyond said roller in the direction of feed of the tubular member and including a conductor having a longitudinally extending part which is narrower than said predetermined width and which projects into the gap between said opposed edges to be heated, means fixedly supporting said inductor with said longitudinal projecting part aligned centrally of said spacer rib in the direction of feed, and compressing means located beyond said inductor in the direction of feed for compressing said heated edges together to weld the seam while maintaining them aligned symmetrically with respect to the plane of symmetry of the inductor, said compressing means comprising a pair of laterally adjustable pressure rollers mounted to engage and exert inward pressure on opposite sides of the tubular member and a pair of vertically adjustable pressure rollers one of which is mounted to engage and exert inward pressure on the marginal zones of the tubular member adjacent the edges to be joined and the other of which is mounted to engage and support the tubular member opposite the seam, and means for independently adjusting the position of each of said pressure rollers in directions substantially radially of the tubular member, the widths of said peripheral spacer rib and said longitudinal projecting part of the inductor and the distance between the spacer rib and the compressing means being so dimensioned, and the lateral and vertical positions of the pressure rollers being so adjusted, that the said opposed edges are spaced from and do not touch said longitudinal projecting part during their passage therepast.

5. Apparatus as claimed in claim 4, wherein said one of the vertical pressure rollers which engages the marginal zones of the tubular member adjacent the edges to be joined is formed with a circumferential recess to receive the oxide and welding scale squeezed out of the welded seam by the welding pressure.

6. Induction heating apparatus as claimed in claim 4, wherein the longitudinal sides of the longitudinally projecting part of the inductor are parallel for a part of its length and the rear portion of said projecting part tapers convergently in height and width in the direction of feed of the tubular member.

References Cited in the file of this patent

UNITED STATES PATENTS

| | | |
|---|---|---|
| 2,582,955 | Body | Jan. 22, 1952 |
| 2,687,465 | Crawford | Aug. 24, 1954 |
| 2,737,563 | Abel | Mar. 6, 1956 |
| 2,761,939 | Finchelstein et al. | Sept. 4, 1956 |
| 2,763,756 | Rudd et al. | Sept. 18, 1956 |